United States Patent
Huang et al.

(10) Patent No.: US 8,046,134 B2
(45) Date of Patent: Oct. 25, 2011

(54) STEERING SYSTEM HAVING MULTIPLE STRATEGIES AND VARIABLE DEADZONE

(75) Inventors: Xiaodong Huang, Kobe (JP); John J. Krone, Peoria, IL (US); Brad A. Edler, Waterloo, IL (US); Mark L. Westphalen, Washington, IL (US); Yongmin Ma, Peoria, IL (US); Brent M. Carr, Peoria, IL (US)

(73) Assignee: Caterpilar Inc., Peoria, IL (US)

( * ) Notice: Subject to any disclaimer, the term of this patent is extended or adjusted under 35 U.S.C. 154(b) by 0 days.

(21) Appl. No.: 12/908,116

(22) Filed: Oct. 20, 2010

(65) Prior Publication Data

US 2011/0035112 A1 Feb. 10, 2011

Related U.S. Application Data

(62) Division of application No. 12/545,939, filed on Aug. 24, 2009, now Pat. No. 7,853,380, which is a division of application No. 11/589,160, filed on Oct. 30, 2006, now Pat. No. 7,624,836.

(51) Int. Cl.
*B62D 12/00* (2006.01)
(52) U.S. Cl. .......................................... 701/42; 180/6.2
(58) Field of Classification Search .............. 701/41–44; 181/6.2–6.24, 6.44; 475/18–19; 180/6.2
See application file for complete search history.

(56) References Cited

U.S. PATENT DOCUMENTS

| | | | |
|---|---|---|---|
| 4,507,601 A | 3/1985 | Andresen | |
| 5,097,917 A * | 3/1992 | Serizawa et al. | 180/402 |
| 5,103,924 A | 4/1992 | Walker | |
| 5,249,422 A | 10/1993 | Smith et al. | |
| 5,607,028 A | 3/1997 | Braun et al. | |
| 5,831,596 A | 11/1998 | Marshall et al. | |
| 5,918,195 A | 6/1999 | Halgrimson et al. | |
| 5,957,987 A | 9/1999 | Sudo et al. | |
| 6,148,939 A | 11/2000 | Brookhart et al. | |
| 6,173,223 B1 | 1/2001 | Liubakka et al. | |
| 6,259,433 B1 | 7/2001 | Meyers | |
| 6,305,162 B1 | 10/2001 | Cobo et al. | |
| 6,460,639 B1 | 10/2002 | Hori et al. | |
| 6,538,637 B1 | 3/2003 | Kor | |
| 6,540,043 B2 | 4/2003 | Will | |
| 6,542,789 B2 | 4/2003 | Ufheil | |
| 6,542,801 B2 | 4/2003 | Kawashima | |
| 6,580,417 B2 | 6/2003 | Rosenberg et al. | |

(Continued)

FOREIGN PATENT DOCUMENTS

JP 06-222852 8/1994

(Continued)

*Primary Examiner* — Yonel Beaulieu
(74) *Attorney, Agent, or Firm* — Finnegan, Henderson, Farabow, Garrett & Dunner LLP (57) ABSTRACT

A steering system for a machine having at least one steerable traction device is disclosed. The steering system may have a steering actuator operatively connected to the at least one steerable traction device, and a travel speed sensor configured to generate a signal indicative of a travel speed of the machine. The steering mechanism may also have an operator input device having a deadzone. The deadzone may vary in response to the signal. The steering system may also have a controller in communication with the steering actuator, the operator input device, and the travel speed sensor. The controller may be configured to affect operation of the steering actuator in response to operation of the operator input device only when the operation of the operator input device deviates from the deadzone.

20 Claims, 5 Drawing Sheets

U.S. PATENT DOCUMENTS

| | | |
|---|---|---|
| 6,594,568 B2 | 7/2003 | Matsuoka |
| 6,651,544 B2 | 11/2003 | Skinner |
| 6,668,967 B2 | 12/2003 | Sørensen et al. |
| 6,687,589 B2 | 2/2004 | Kanda |
| 6,738,695 B1 | 5/2004 | Motz et al. |
| 6,750,845 B2 | 6/2004 | Hopper |
| 6,832,144 B2 | 12/2004 | Momiyama et al. |
| 6,843,342 B2 | 1/2005 | Shimizu et al. |
| 6,845,310 B2 | 1/2005 | Shimizu et al. |
| 6,856,870 B2 | 2/2005 | Shimizu et al. |
| 6,915,194 B2 | 7/2005 | Kodama et al. |
| 6,931,313 B2 * | 8/2005 | Kato et al. ............. 701/41 |
| 6,935,449 B2 | 8/2005 | Chernoff et al. |
| 7,086,496 B2 | 8/2006 | Kodama |
| 7,624,836 B2 | 12/2009 | Huang et al. |
| 7,853,380 B2 | 12/2010 | Huang et al. |
| 2002/0074179 A1 | 6/2002 | Brandt et al. |
| 2002/0153188 A1 | 10/2002 | Brandt et al. |
| 2004/0100145 A1 | 5/2004 | Holt et al. |
| 2004/0111202 A1 | 6/2004 | Mailer |
| 2004/0148077 A1 | 7/2004 | Yasui et al. |
| 2005/0139412 A1 | 6/2005 | Vigholm |
| 2005/0224277 A1 | 10/2005 | Kato et al. |
| 2006/0015229 A1 | 1/2006 | Lange et al. |
| 2006/0042129 A1 | 3/2006 | Satake et al. |
| 2007/0088482 A1 | 4/2007 | Mailer |

FOREIGN PATENT DOCUMENTS

| | | |
|---|---|---|
| WO | WO 2004/021330 A1 | 3/2004 |

* cited by examiner

FIG. 9

STEERING SYSTEM HAVING MULTIPLE STRATEGIES AND VARIABLE DEADZONE

CROSS-REFERENCE TO RELATED APPLICATIONS

This patent application is a Divisional of U.S. patent application Ser. No. 12/545,939, filed Aug. 24, 2009, which is based on U.S. patent application Ser. No. 11/589,160, filed Oct. 30, 2006, now U.S. Pat. No. 7,624,836.

TECHNICAL FIELD

The present disclosure relates generally to a steering system and, more particularly, to a steering system that utilizes multiple control strategies and a speed based variable deadzone.

BACKGROUND

Mobile machines, including wheel loaders, haul trucks, motor graders, and other types of heavy equipment, are used for a variety of tasks. In order to accomplish these tasks, the machines typically include hydraulic and/or electric actuators that cause the machine to steer. For example, a machine may include an articulated joint and one or more associated hydraulic cylinders connected between the joint and a frame of the machine. In response to an operator input to a control system, the hydraulic cylinders expand and retract to cause a forward end of the machine to pivot about the articulated joint relative to a back end of the machine, thereby steering the machine. In another example, the machine may include one or more wheels that pivot at a vertical joint between the wheel and the frame. One or more hydraulic cylinders may be connected between the wheel and the frame of the machine to expand and retract in response to the operator input to a control system, thereby causing the wheel to pivot about the joint and steer the machine.

The steering of the machine may be controlled through a number of different strategies. One strategy includes controlling a steering position of the machine based on a positional input of the operator. In other words, as the operator turns a steering wheel or tilts a joystick lever a particular angle away from a neutral position, the articulated joint or wheel is pivoted an amount corresponding to the particular angle. Another strategy includes controlling a steering speed of the machine based on a speed input of the operator. That is, as the operator manipulates the steering wheel or joystick lever, a speed of the manipulation may be determined and the pivot speed of the articulation joint or wheel correspondingly controlled.

Regardless of which strategy is utilized to effect steering of the machine, it may be beneficial to modify the steering gain (i.e., the ratio of steering output actuation to steering input) and/or the steering deadzone (i.e., the minimum displacement amount away from the neutral position or the minimum input speed of the steering wheel or joystick required before steering of the machine is effected) in response to a travel speed of the machine. For example, when moving at low speeds, the operator may want the gain to be high and the deadzone small for responsive steering. In contrast, when moving a higher speeds, the operator may desired the gain to be smaller and the deadzone larger to prevent unintentional steering and minimize over corrections.

Examples of a positional input steering system and a velocity input steering system utilizing variable gain is disclosed in U.S. Patent Publication No. 2005/0139412 (the '412 publication) by Vigholm published on Jun. 30, 2005. The '412 publication describes a wheel loader having an articulation point and being steered by adjustment of an angle between two drive axles relative to the articulation point. A steering wheel and a steering lever are provided in parallel for steering control of the wheel loader. When either the steering wheel or steering lever are moved from a neutral position, the position of the steering wheel and lever are sensed. Based on the sensed position, the angle between the drive axles is correspondingly adjusted.

The magnitude of the angle between the drive axles described in the '412 publication and the speed at which the angle is adjusted depend on a travel speed of the wheel loader. That is, when the wheel loader is traveling relatively slow, upon moving either the steering wheel or lever to a particular position, the corresponding adjustment angle is greater and is achieved more slowly than when the wheel loader is traveling faster. In this manner, a large gentle-feeling steering deflection is provided to the operator at slow speeds, while a quick, yet controllable deflection is provided to the operator at high speeds.

The '412 publication also describes that the speed at which the adjustment angle is achieved can be affected by the steering speed input of the operator. In other words, if an operator turns the steering wheel quickly to a predetermined position, the corresponding adjustment angle will be achieved quicker than if the operator turns the steering wheel slowly.

Although the wheel loader steering system of the '412 publication may describe two alternate steering strategies (i.e., position input-position controlled and velocity input-velocity controlled), it may be limited. In particular, the system of the '412 publication does not allow the two alternate strategies to be selectively implemented within the same machine or with the same steering input device (i.e., the steering wheel or lever). There may be situations when an operator desires the velocity input of the steering wheel or lever to effect the adjustment angle such as when traveling at high speeds, and other situations when the operator desires the velocity input to have no affect such as when traveling at low speeds. In addition, when both the steering wheel and lever are provided on the same machine, an operator may desire the steering wheel input velocity to affect the adjustment angle of the wheel loader, but the steering lever velocity to have no affect on the adjustment angle. The wheel loader steering system of the '412 publication does not provide the operator with these capabilities. In addition, the '412 publication does not describe a deadzone, or a travel speed of the wheel loader affecting the deadzone.

The disclosed steering system is directed to overcoming one or more of the problems set forth above.

SUMMARY OF THE INVENTION

In another aspect, the present disclosure is directed to another steering system for a machine having at least one steerable traction device. The steering system includes a steering actuator operatively connected to the at least one steerable traction device and a travel speed sensor configured to generate a signal indicative of a travel speed of the machine. The steering system also includes an operator input device having a deadzone that varies in response to the signal, and a controller in communication with the steering actuator, the operator input device, and the travel speed sensor. The controller is configured to affect operation of the steering actuator in response to operation of the operator input device only when the operation of the operator input device deviates from the deadzone.

In yet another aspect, the present disclosure is directed to another steering system for a machine having at least one steerable traction device. The steering system includes a steering actuator operatively connected to the at least one steerable traction device and a steering feedback angle sensor associated with the at least one steerable traction device. The steering feedback angle sensor is configured to generate a first signal corresponding to a position of the at least one steerable traction device. The steering system also includes an operator input device and a speed sensor associated with the operator input device. The speed sensor is configured to generate a second signal corresponding to an actuation speed of the operator input device. The steering system further includes a controller in communication with the steering feedback angle sensor and speed sensor. The controller is configured to calculate an absolute operator input device position based on only the first and second signals.

In yet another aspect, the present disclosure is directed to another steering system for a machine having at least one steerable traction device. The steering system includes a steering actuator operatively connected to the at least one steerable traction device, an operator input device, and a controller in communication with the steering actuator and the operator input device. The controller is configured to control operation of the steering actuator in response to a position of the operator input device during a first operational condition, and control operation of the steering actuator in response to a speed of the operator input device during a second operational condition.

In yet another aspect, the present disclosure is directed to another method of steering a machine having at least one traction device. The method includes monitoring a travel speed of the machine and an operator manipulation of a steering device having a deadzone. The method also includes varying the deadzone in response to the monitored travel speed and executing a steering maneuver when operation of the steering device deviates from the deadzone.

In yet another aspect, the present disclosure is directed to a method of determining an absolute steering wheel angle. The method includes sensing a traction device steering feedback angle and monitoring a steering wheel velocity. The method also includes converting the monitored steering wheel velocity to an incremental steering wheel position value and adding the incremental steering wheel position value to the sensed steering feedback angle.

In yet another aspect, the present disclosure is directed to a method of steering a machine having at least one traction device. The method includes monitoring a travel speed of the machine and an operator manipulation of a steering device. The method also includes executing a steering maneuver in response to a position of the steering device when the travel speed is below a predetermined threshold value and executing a steering maneuver in response to an actuation speed of the steering device when the travel speed is above the predetermined threshold value.

DETAILED DESCRIPTION

Figure 1:
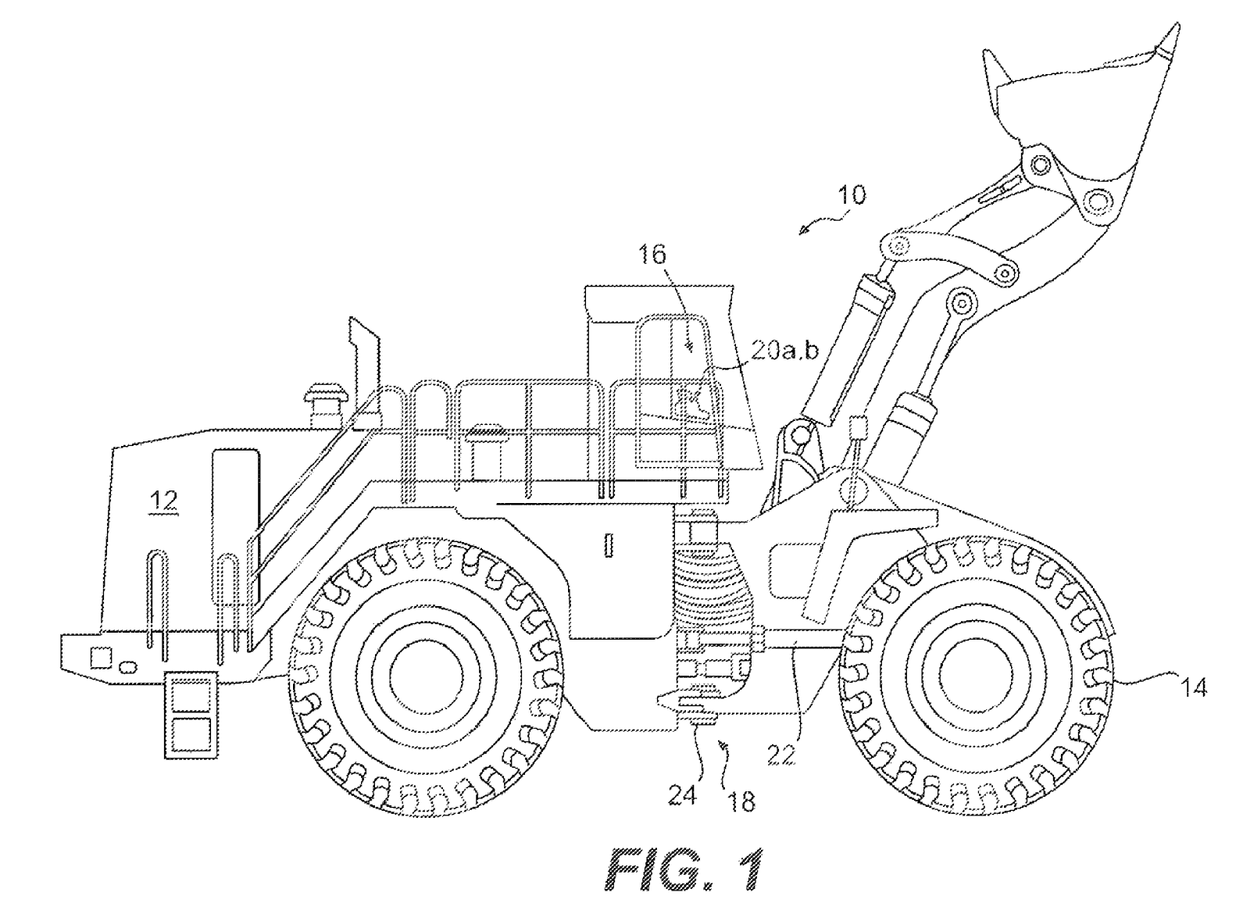
FIG. 1 is a diagrammatic illustration of an exemplary disclosed machine.

FIG. 1 illustrates an exemplary embodiment of a machine 10. Machine 10 may be a mobile machine that performs some type of operation associated with an industry such as mining, construction, farming, or any other industry known in the art. For example, machine 10 may be an earth moving machine such as a wheel loader, a haul truck, a backhoe, a motor grader, or any other suitable operation-performing machine. Machine 10 may include a power source 12, at least one traction device 14, an operator cabin 16, and a steering mechanism 18.

Power source 12 may embody an engine such as, for example, a diesel engine, a gasoline engine, a gaseous fuel powered engine such as a natural gas engine, or any other type of engine apparent to one skilled in the art. Power source 12 may alternatively embody a non-combustion source of power such as a fuel cell, a power storage device, an electric motor, or other similar mechanism. Power source 12 may be connected to drive traction device 14, thereby propelling machine 10.

Traction device 14 may include wheels located on each side of machine 10 (only one side shown). Alternately, traction device 14 may include tracks, belts or other known traction devices. It is contemplated that any of the wheels on machine 10 may be driven and/or steered.

Operator cabin 16 may include devices that receive input from a machine operator indicative of a desired steering maneuver. Specifically, operator cabin 16 may include one or more operator interface devices 20a, b embodied as steering wheels, single or multi-axis joysticks, or other known steering devices located proximate an operator seat. Operator interface devices 20a, b may be proportional-type controllers configured to orient machine 10 by producing steering position and/or steering velocity signals that are indicative of a desired machine steering maneuver.

Steering mechanism 18 may include one or more hydraulic cylinders 22 located on each side of machine 10 (only one side shown in FIG. 1) that function in cooperation with a centrally-located articulated axis 24. To affect steering, the hydraulic cylinder 22 located on one side of machine 10 may extend while the hydraulic cylinder 22 located on the opposite side of machine 10 simultaneously retracts, thereby causing a forward end of machine 10 to pivot about articulated axis 24 relative to a back end of machine 10 (illustrated in FIG. 5). It is contemplated that steering mechanism 18 may alternatively include a greater or lesser number of hydraulic cylinders 22 and/or that a different configuration of hydraulic cylinders 22 may be implemented such as a direct connection to one or more steerable traction devices 14 of machine 10 (illustrated in FIG. 6). It is further contemplated that steering mechanism 18 may include steering actuators other than hydraulic cylinders such as, for example, electric or hydraulic motors.

The extension and retraction of hydraulic cylinders 22 may be effected by creating an imbalance of force on a piston assembly (not shown) disposed within a tube (not shown) of each hydraulic cylinder 22. Specifically, each of hydraulic cylinders 22 may include a first chamber (not shown) and a second chamber (not shown) separated by the piston assembly. The piston assembly may include two opposing hydraulic surfaces, one associated with each of the first and second chambers. The first and second chambers may be selectively supplied with a pressurized fluid and drained of the pressurized fluid to create an imbalance of force on the two surfaces that causes the piston assembly to axially displace within the tube.

Figure 2:
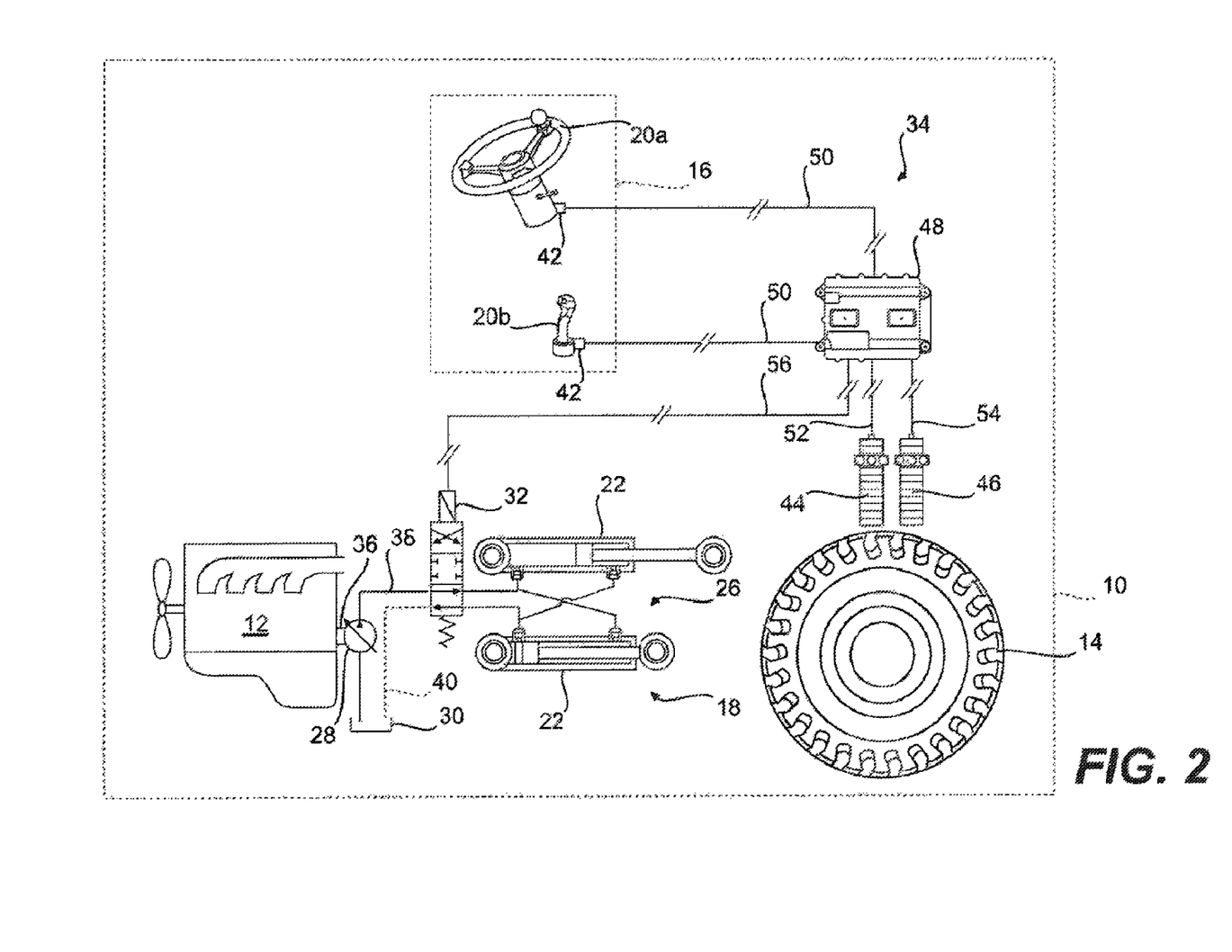
FIG. 2 is a schematic and diagrammatic illustration of an exemplary disclosed steering system for the machine of FIG. 1.

As illustrated in FIG. 2, machine 10 may also include a hydraulic circuit 26 configured to selectively fill and drain hydraulic cylinders 22, thereby steering machine 10. Hydraulic circuit 26 may include a source 28 of pressurized fluid, a tank 30, a steering control valve 32, and a control system 34. It is contemplated that hydraulic circuit 26 may include additional or different components than those illustrated in FIG. 2 and listed above such as, for example, accumulators, check valves, pressure relief or makeup valves, pressure compensating elements, restrictive orifices, and other hydraulic components known in the art.

Source 28 may produce a flow of pressurized fluid and include a variable displacement pump, a fixed displacement pump, a variable flow pump, or any other source of pressurized fluid known in the art. Source 28 may be drivably connected to power source 12 by, for example, a countershaft 36, a belt (not shown), an electric circuit (not shown), or in any other suitable manner. Although FIG. 2 illustrates source 28 as being dedicated to supplying pressurized fluid to only hydraulic circuit 26, it is contemplated that source 28 may alternatively supply pressurized fluid to additional machine hydraulic circuits.

Tank 30 may embody a reservoir configured to hold a supply of fluid. The fluid may include, for example, an engine lubrication oil, a transmission lubrication oil, a separate hydraulic oil, or any other fluid known in the art. Source 28 may draw fluid from and return fluid to tank 30. It is contemplated that source 28 may be connected to multiple separate fluid tanks, if desired.

Steering control valve 32 may fluidly communicate with source 28 and tank 30. Specifically, steering control valve 32 may be connected to source 28 via a supply line 38, and to tank 30 via a drain line 40 to control actuation of hydraulic cylinders 22. Steering control valve 32 may include at least one valve element that functions to meter pressurized fluid to one of the first and second chambers within hydraulic cylinder 22, and to simultaneously allow fluid from the other of the first and second chambers to drain to tank 30. In one example, the valve element of steering control valve 32 may be pilot actuated against a spring bias to move between a first position at which fluid is allowed to flow into one of the first and second chambers while allowing the fluid to drain from the other of the first and second chambers to tank 30, a second position at which the flow directions are reversed, and a third neutral position at which fluid flow is blocked from both of the first and second chambers. The location of the valve element between the first, second, and third positions may determine a flow rate of the pressurized fluid into and out of the associated first and second chambers and a corresponding steering velocity (i.e., the time derivative of a steering angle) of steering mechanism 18. It is contemplated that one steering control valve 32 may regulate the filling and draining functions for both hydraulic cylinders 22 of machine 10 or, alternatively, that a separate steering control valve 32 may be associated with each hydraulic cylinder 22. It is also contemplated that steering control valve 32 may alternatively be replaced with multiple independent metering valves that control the filling and draining functions of each of the first and second chambers for each hydraulic cylinder 22 separately. It is further contemplated that steering control valve 32 may alternatively be hydraulically actuated, mechanically actuated, pneumatically actuated, or actuated in any other suitable manner.

Control system 34 may include components in communication with hydraulic circuit 26, operator cabin 16, and traction device 14 of machine 10. In particular, control system 34 may include a steering input sensor 42 associated with each operator interface device 20a and 20b, a travel speed sensor 44 associated with traction device 14, a steering feedback angle sensor 46 associated with steering mechanism 18, and a controller 48 in communication with each of the sensors.

Each steering input sensor 42 may monitor operation of the associated operator interface device 20a, b, and generate a signal indicative of the operation. For example, steering input sensor 42 may embody a position sensor configured to monitor a displacement angle $\theta$ of operator interface device 20a, b and generate a corresponding displacement signal. The monitored displacement angle $\theta$ may then be differentiated with respect to time to calculate an angular velocity $\omega$. Alternatively, steering input sensor 42 could embody a velocity sensor configured to directly monitor angular velocity $\omega$ and generate a corresponding signal. In this situation, angular velocity $\omega$ may be integrated to determine an incremental position of operator interface device 20a, b, which may then be used to calculate displacement angle $\theta$, as will be described in more detail below. It is also contemplated that control system 34 could alternatively include both a position sensor and a velocity sensor associated with each operator interface device 20a, b.

Figures 3, 4:
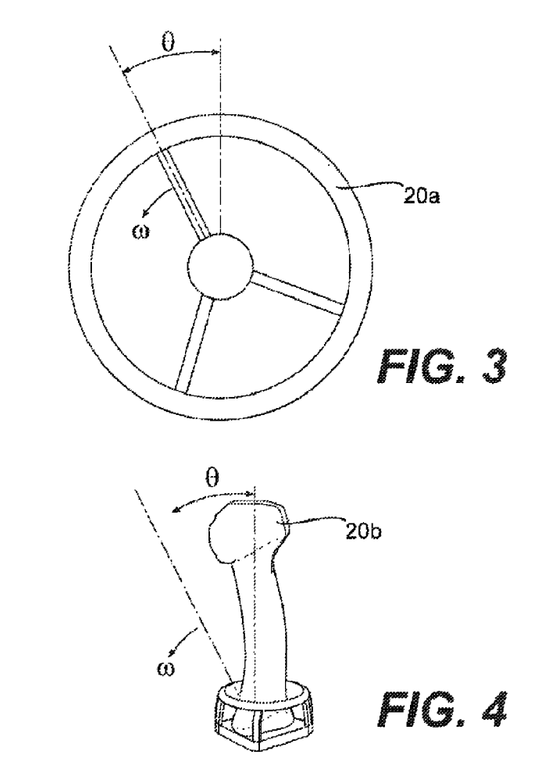
FIG. 3 is a diagrammatic illustration of an exemplary steering input mechanism for the steering system of FIG. 2.
FIG. 4 is a diagrammatic illustration of another exemplary steering input mechanism for the steering system of FIG. 2.

As illustrated in FIGS. 3 and 4, displacement angle $\theta$ and angular velocity $\omega$ may be common measurements between the different operator interface devices 20a, b. For example, FIG. 3 illustrates displacement angle $\theta$ as being the angular measurement of steering wheel displacement with respect to a center axis of rotation. Similarly, angular velocity $\omega$ is illustrated as the rotational speed of the steering wheel about the center axis of rotation. In contrast, FIG. 4 illustrates displacement angle $\theta$ as being the tilt angle of a joystick relative to a neutral perpendicular axis extending through the base of the joystick. Similarly, angular velocity $\omega$ is illustrated as the tilt speed of the joystick away from the or towards the neutral perpendicular axis.

Travel speed sensor 44 (referring to FIG. 2) may embody a magnetic pickup-type sensor. In particular, travel speed sensor 44 may be associated with traction device 14 or another drive train component of machine 10 to sense a rotational speed thereof and produce a corresponding speed signal. For example, travel speed sensor 44 may include a hall-effect element disposed proximal a magnet (not shown) embedded within a driveshaft of traction device 14, proximal a magnet (not shown) embedded within a component directly or indirectly driven by the drive shaft, or in other suitable manner to sense a rotational speed of traction device 14 and produce a corresponding speed signal. It is also contemplated that travel speed sensor 44 could alternatively embody another type of speed sensor such as, for example, a laser sensor, a radar sensor, or other type of speed sensing device, which may or may not be associated with a rotating component.

Figure 5:
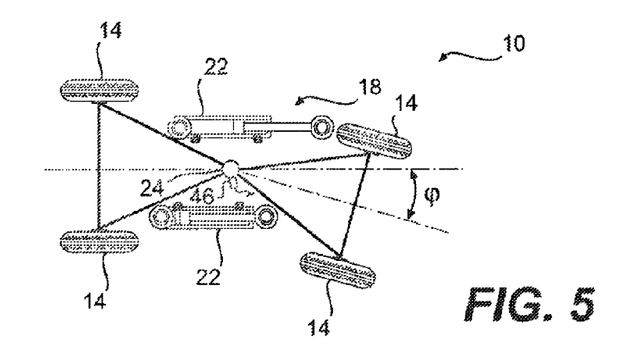
FIG. 5 is a diagrammatic illustration of an exemplary disclosed steering configuration for the machine of FIG. 1.
Figure 6:
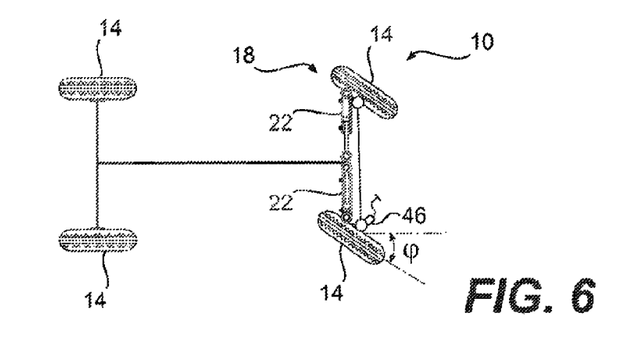
FIG. 6 is a diagrammatic illustration of another exemplary disclosed steering configuration for the machine of FIG. 1.

Steering feedback angle sensor 46 may be associated with steering mechanism 18 to produce a signal indicative of the orientation of traction device 14 relative to a travel direction of machine 10. For example, steering feedback angle sensor 46 may embody a displacement angle sensor similar to steering input sensor 42 described above, or a position/extension sensor associated with hydraulic cylinder 22. As illustrated in FIG. 5, steering feedback angle sensor 46 may be associated with articulation axis 24 to determine a displacement angle φ between the front end of machine 10 and the back end of machine 10. Alternatively, if each of cylinders 22 is directly connected to traction devices 14, as illustrated within FIG. 6, steering feedback angle sensor 46 could be disposed proximal one or both of the pivot joints about which traction devices 14 are steered to determine a displacement angle φ between traction devices 14 and a travel direction of machine 10.

Controller 48 may embody a single microprocessor or multiple microprocessors that include a means for controlling an operation of hydraulic circuit 26. Numerous commercially available microprocessors can be configured to perform the functions of controller 48 and it should be appreciated that controller 48 could readily embody a general machine microprocessor capable of controlling numerous machine functions. Controller 48 may include a memory, a secondary storage device, a processor, and any other components for running an application. Various other circuits may be associated with controller 48 such as power supply circuitry, signal conditioning circuitry, solenoid driver circuitry, and other types of circuitry.

Controller 48 may be in communication with the various components of control system 34 and hydraulic circuit 26. In particular, controller 48 may be in communication with steering input sensor 42, travel speed sensor 44, steering feedback angle sensor 46, and steering control valve 32 via communication lines 50, 52, 54, and 56, respectively. Controller 48 may receive the angular displacement signal, the angular velocity signal, the travel speed signal, the steering feedback angle signal, and regulate the operation of control steering control valve 32 in response to the received signals.

Figure 7:
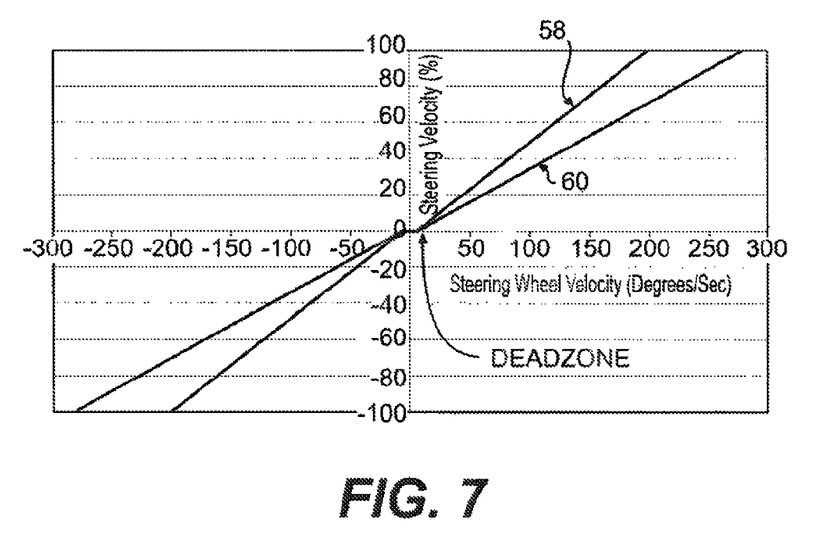
FIG. 7 is a graphic illustration of an exemplary disclosed relationship for the steering system of claim 2.

For example, in response to a steering wheel velocity input monitored via steering input sensor 42, controller 48 may reference a map stored in the memory thereof to determine a corresponding velocity command for steering control valve 32 that results in an operator desired steering velocity. This reference map may include a collection of data in the form of tables, graphs, and/or equations. FIG. 7 illustrates one such map that relates steering wheel and/or joystick velocity measured in degrees per second to steering velocity command measured in percent of a maximum steering speed.

As illustrated in FIG. 7, two curves may be used to determine a steering velocity command based on machine travel speed. Specifically, a first curve 58 may represent the relationship used when machine 10 is traveling at predetermined low travel speed. A second curve 60 may represent the relationship used when machine 10 is traveling at a predetermined high travel speed. When machine 10 is traveling at a speed between, less than, or greater than the two predetermined travel speeds, the steering velocity may be interpolated or extrapolated to obtain a corresponding steering velocity command. In this manner the steering velocity associated with steering mechanism 18 may be related to an operator velocity input, and the gain may be associated with a travel velocity of machine 10 (VIVC).

Figure 8:
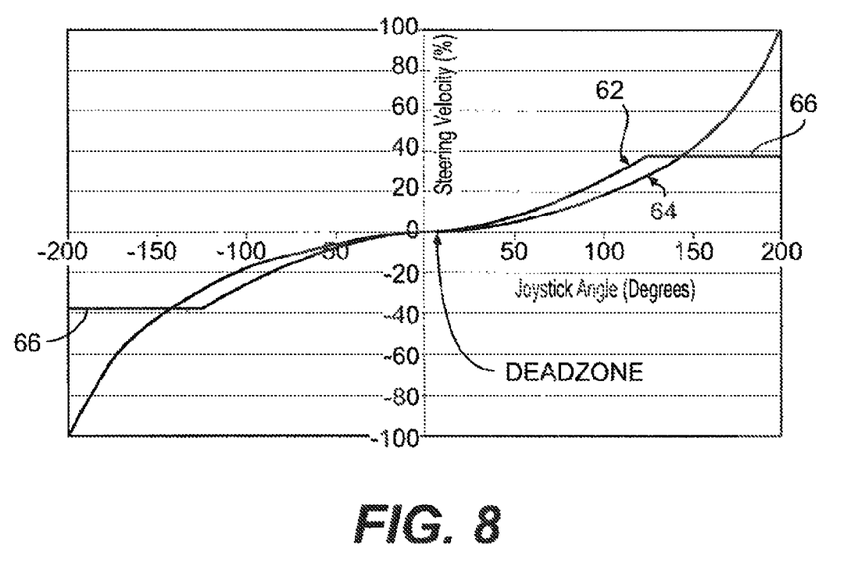
FIG. 8 is a graphic illustration of another exemplary disclosed relationship for the steering system of claim 2.

In another example, in response to a joystick or steering wheel displacement angle monitored via steering input sensor 42, controller 48 may reference a map stored in the memory thereof to determine a corresponding steering velocity command for steering control valve 32 that results in an operator desired steering maneuver. This reference map may also include a collection of data in the form of tables, graphs, and/or equations. FIG. 8 illustrates one such map that relates a joystick position measured in degrees of displacement to a steering velocity command measured in percent of a maximum steering speed. Similar to FIG. 7, FIG. 8 illustrates two curves that may be used to determine a steering velocity command based on machine travel speed. Specifically, a first curve 62 may represent the relationship used when machine 10 is traveling at a predetermined low travel speed. A second curve 64 may represent the relationship used when machine 10 is traveling at a predetermined high travel speed. When machine 10 is traveling at a speed between, less than, or greater than the two predetermined travel speeds, the steering velocity may be interpolated or extrapolated to obtain the steering velocity command. In this manner the speed of steering or the gain associated with steering mechanism 18 may be related to both an operator displacement input and a travel velocity of machine 10 (PIVC).

It is contemplated that controller 48 may control the speed and/or position of steering mechanism 18 based on both a speed and a displacement angle of a single operator interface device 20a, b. In particular, it may be possible for a single operator interface device 20a or b to operate under the position input-velocity control (PIVC) relationship (i.e., the relationship described above regarding operation of operator interface device 20b) during a first operating condition of machine 10, under the velocity input velocity control (VIVC) relationship (i.e., the relationship described above regarding the operation of operator interface device 20a) during a second operating condition, and under a position input position control (PIPC) during a third operating condition. For example, when using operator interface device 20b while machine 10 is traveling at a velocity less then a predetermined threshold value, it may be desirable to operate under the PIVC relationship. In contrast, when using operator interface device 20b while machine 10 is traveling at a velocity over the predetermined threshold value, it may be desirable to operate under the VIVC relationship. Controller 48 may receive the travel velocity signal and automatically control which relationship is implemented in response to the signal. In this manner, the operator may have finer control over slow operations that require precision, and greater stability at higher travel speeds. It is contemplated that a machine operator may alternatively be provided with a means for manually selecting which of the PIVC, VIVC, and PIPC relationships should be implemented. This means could include for example, a manual switch located within operator cabin 16, a software configuration changeable at startup or service of machine 10, or other similar means known in the art.

Controller 48 may provide a deadzone (e.g. band or zone of free play, within which no steering is effected) for each operator interface device 20a, b. Specifically, controller 48 may retain the valve element of steering control valve 32 in the third or neutral position during a range of operation of one or both of operator interface devices 20a, b. As illustrated in FIGS. 7 and 8, this range may include a range of motion about a neutral position, a range of speed about a predetermined speed, or another similar range of operation. When operating within this deadzone (e.g., between a minimum and maximum displacement angle or actuation speed), manipulation of operator interface devices 20a, b may have no affect on the steering of machine 10. In this manner, sensitivity of the operator interface devices 20a, b may be reduced to minimize the likelihood of effecting an undesired steering maneuver.

Controller 48 may automatically vary the range or location of the deadzone. Specifically, the range of the deadzone may be automatically varied in response to a travel speed of machine 10. For example, at high travel speeds, the range may be increased (e.g., the minimum value may be reduced and/or the maximum value may be increased), while at low travel speeds the range may be reduced. Similarly, the location of the range may be modified by increasing both the minimum and maximum values of the range or, in contrast, by decreasing both the minimum and maximum values. The size and location of the range may be varied by modifying the maps contained within the memory of controller 48.

Controller 48 may also limit a maximum steering speed of machine 10. In particular, as depicted by flat sections 66 of first curve 62 within FIG. 8, the steering speed may be limited to a predetermined speed less than a maximum steering speed when machine 10 is traveling at an absolute travel speed greater than a limiting threshold value. This speed limit and threshold value may be varied by modifying the maps stored within the memory of controller 48. By limiting the steering speed of machine 10 at high travel speeds, the stability of machine 10 may be improved.

Figure 9:
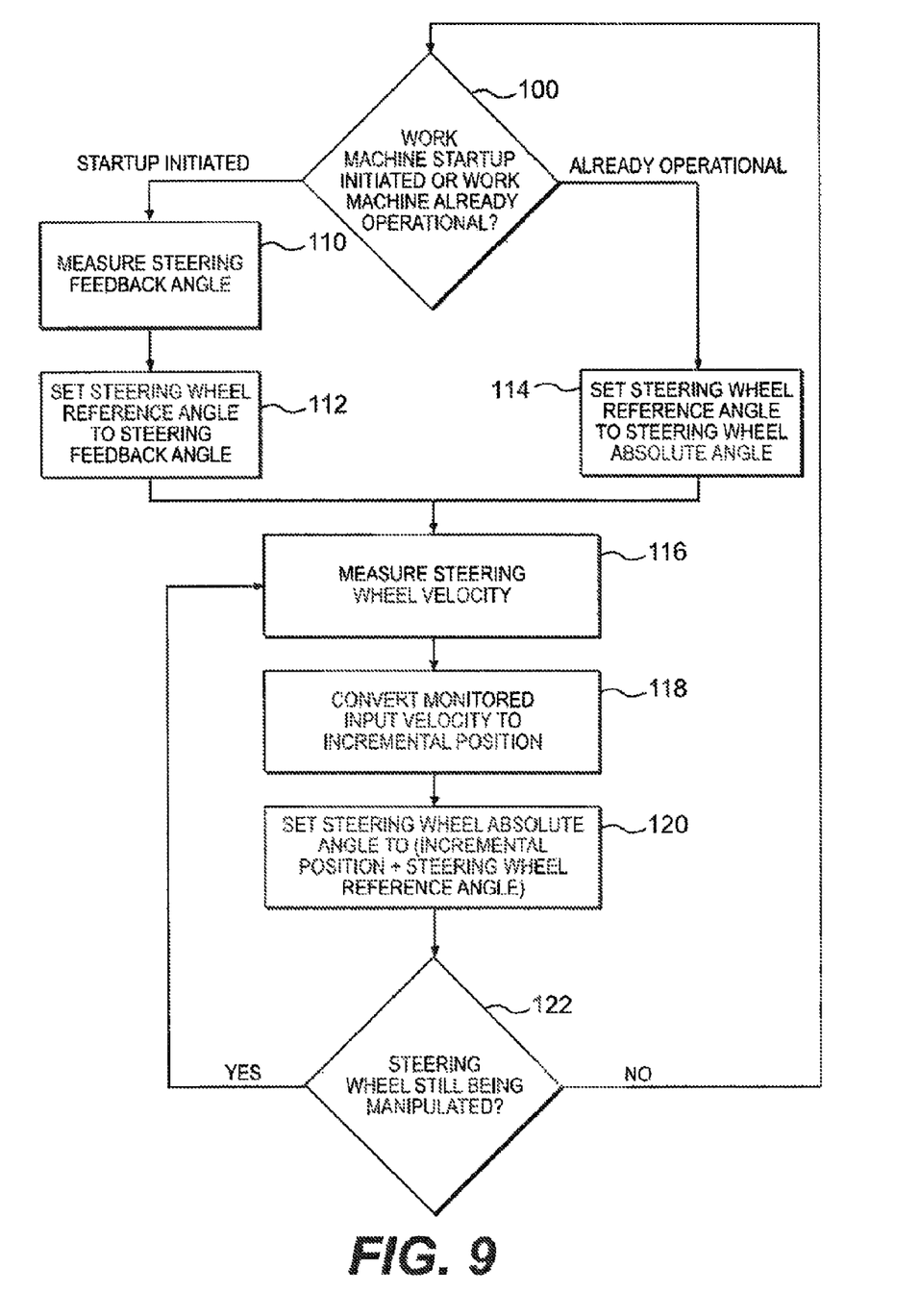
FIG. 9 is a flowchart depicting an exemplary operation of the steering system of FIG. 2.

FIG. 9 illustrates a flow chart depicting an exemplary method used for calculating an absolute position of operator interface device 20a. FIG. 9 will be discussed in the following section to further illustrate the disclosed control system and its operation.

INDUSTRIAL APPLICABILITY

The disclosed steering system may be applicable to any machine where steering velocity control is desirable. Particularly, the disclosed steering system provides customized steering velocity control through the use of multiple operator interface devices that function under position or velocity relationships, or a single operator interface device that can selectively function under either relationship. In addition, the disclosed system provides steering velocity control that improves stability and control by factoring in machine travel speed. The operation of hydraulic circuit 26 will now be described.

Controller 48 may regulate the steering of machine 10 in response to a manipulation of one or both of operator interface devices 20a, b. Specifically, upon receiving a signal from steering input sensor 42, controller 48 may direct steering control valve 32 to selectively fill and drain hydraulic cylinders 22 of pressurized fluid at a flow rate corresponding to a desired steering maneuver. The flow of pressurized fluid into and out of the first or second chambers of hydraulic cylinder 22 may either extend or retract the piston assembly of the associated hydraulic cylinder 22. The extension of hydraulic cylinder 22 on one side of machine 10 and the retraction of hydraulic cylinder 22 on the opposite side of machine 10 may create a moment about a joint that effects steering of machine 10.

Machine travel speed may affect a steering velocity of machine 10. In particular, in response to operator displacement or velocity input exceeding the deadzone associated with the respective operator input devices 20a or b, and a monitored travel speed of machine 10, controller 48 may reference the maps stored within the memory thereof and determine a steering velocity command. This steering velocity command may then be sent to steering control valve 32, thereby causing a flow rate of pressurized fluid to hydraulic cylinders 22 that results in the operator desired steering velocity. As the travel velocity of machine 10 increases, the steering velocity command may decrease. As the travel velocity of machine 10 decreases, the steering velocity command may increase. If traveling above a predetermined velocity, the steering velocity command may be limited to a value less than a maximum steering velocity to improve stability of machine 10.

Operator interface devices 20a, b may operate under VIVC relationships, PIVC relationships, PIPC relationships, or any combination of the three relationships. In some situations, it may be beneficial to have multiple operator interface devices 20a, b such as, a steering wheel and a joystick within the same operator cabin 16. In this situation, the steering wheel (operator interface device 20a) may operate under the VIVC relationship, while the joystick (operator interface device 20b) may operate under the PIVC relationship.

It may also be possible for a single operator interface device 20a to utilize the VIVC, PIVC, and PIPC relationships without a change in hardware. Switching between the three relationships may be automatic based on a travel speed of machine 10 or, alternatively, manually initiated. During PIVC and PIPC control, it can be important to know an absolute position (i.e., angle away from a neutral position relative to a steering or pivot axis, wherein the angle is related to a machine steering angle) of operator interface device 20a. However, if set up for VIVC control, steering input sensor 42 may only monitor an operational velocity of operator interface device 20a. FIG. 9 outlines a method that may be implemented to determine an absolute position of operator interface device 20a, without the additional hardware of a steering input sensor 42 that monitors position.

The method of calculating the absolute position of operator interface device 20a may first begin by controller 48 determining if machine startup has been initiated or if machine 10 is already operational (Step 100). This determination may be made by monitoring a startup operation of machine 10 such as, for example the position of an ignition key, a speed of power source 12, a time duration since a previous last steering manipulation, or other such machine operation indicative of startup. Two different operations may be performed depending whether machine 10 has just completed startup or if machine 10 is already operational.

For example, if it has been determined that startup has been initiated, controller 48 may measure, via steering feedback angle sensor 46, the current angle of steering mechanism 18 (Step 110) and set a steering wheel reference angle value equal to the measured steering feedback angle (Step 112). However, if it has been determined that machine 10 is already operational, the steering wheel reference angle value may be set equal to a previously determined steering wheel absolute angle (Step 114).

At any point following startup of machine 10, controller 48 may either periodically or continuously monitor, via steering input sensor 42, a manipulation velocity of operator interface device 20a (Step 116). As operator interface device 20a is being manipulated, the monitored velocity may be converted into an incremental position value (Step 118), which may be added to the steering wheel reference angle value to determine the current steering wheel absolute angle (Step 120). The conversion of monitored velocity into the incremental position value may include the integration of the monitored velocity over the time during which operator interface device 20a is manipulated. As controller 48 is monitoring the manipulation of operator interface device 20a, controller 48 may determine when the manipulation has ended (e.g., when operator interface device 20a has been returned to the deadzone) (Step 122). As long as operator interface device 20a is being manipulated, controller 48 may continue to perform steps 116-120. Once manipulation of operator interface device 20a has ended, control may return to step 100.

Because controller 48 can selectively control the steering velocity of machine 10 (e.g., manually or automatically in response to a machine travel velocity) based on the position or velocity of operator interface devices 20a, b, greater flexibility may be provided to an operator of machine 10. In particular, an operator may be provided with PIVC control when necessary for particular operating conditions, and VIVC or PIPC control during other operating conditions. This flexibility may improve the overall stability of machine 10, as well as the quality of work performed by machine 10. In addition, because the deadzone may be varied based on a travel speed of machine 10, unintended steering maneuvers may be prevented.

The ability to control operator interface device 20a under either the VIVC, PIVC, or PIPC relationships with the same hardware may allow for a lower cost system. In particular, the ability to calculate the absolute position of operator interface device 20a based on only a velocity input may allow for control under VIVC, PIVC, or PIPC relationships without additional position sensors. By minimizing the hardware, the cost of the steering system may be reduced.

It will be apparent to those skilled in the art that various modifications and variations can be made to the disclosed steering system without departing from the scope of the invention. Other embodiments of the steering system will be apparent to those skilled in the art from consideration of the specification and practice of the steering system disclosed herein. It is intended that the specification and examples be considered as exemplary only, with a true scope being indicated by the following claims and their equivalents.

What is claimed is:

1. A steering system for a machine having at least one steerable traction device, comprising:
   an operator input device configured to produce steering signals indicative of a desired machine steering maneuver;
   a steering actuator operatively connected to the at least one steerable traction device; and
   a controller in communication with the steering actuator and being configured to:
      control operation of the steering actuator in response to a position of the operator input device during a first operational condition; and
      control operation of the steering actuator in response to a speed of the operator input device during a second operational condition,
   wherein the position of the operator input device affects a steering command for operation of the steering actuator during the first operational condition, and
   wherein the speed of the operator input device affects a steering command for operation of the steering actuator during the second operational condition.

2. The steering system of claim 1, wherein the first and second operational conditions are travel speeds of the machine.

3. The steering system of claim 1, wherein the first and second operational conditions are manual inputs from an operator indicating a desire for a particular steering control strategy.

4. The steering system of claim 1, wherein the controller is configured to modify a gain of the steering actuator in response to a travel speed of the machine.

5. The steering system of claim 4, wherein the controller is configured to limit the gain of the steering actuator to a value less than a maximum gain value when the travel speed of the machine is above a predetermined value.

6. The steering system of claim 1, wherein the operator input device includes a steering wheel.

7. The steering system of claim 1, wherein the operator input device includes a joystick.

8. The steering system of claim 1, wherein the operator input device includes a steering wheel and a joystick, and wherein the joystick controls operation of the steering actuator in response to a position of the joystick, and the steering wheel controls operation of the steering actuator in response to a speed of the steering wheel.

9. The steering system of claim 1, wherein the steering command is a steering velocity command.

10. A machine comprising:
    at least one steerable traction device;
    a steering actuator operatively coupled to the at least one steerable traction device;
    an operator input device configured to produce steering signals indicative of a desired machine steering maneuver; and
    a controller in communication with the steering actuator and being configured to:
       control operation of the steering actuator in response to a position of the operator input device during a first operational condition; and
       control operation of the steering actuator in response to a speed of the operator input device during a second operational condition,
    wherein the position of the operator input device affects a steering command for operation of the steering actuator during the first operational condition, and
    wherein the speed of the operator input device affects a steering command for operation of the steering actuator during the second operational condition.

11. The machine of claim 10, wherein the machine includes a forward end and a back end, and wherein the steering actuator is configured to pivot the forward end about an axis relative to the back end.

12. The machine of claim 10, wherein the first and second operational conditions are travel speeds of the machine.

13. The machine of claim 10, wherein the first and second operational conditions are manual inputs from an operator indicating a desire for a particular steering control strategy.

14. The machine of claim 10, wherein the controller is configured to modify a gain of the steering actuator in response to a travel speed of the machine.

15. The machine of claim 14, wherein the controller is configured to limit the gain of the steering actuator to a value less than a maximum gain value when the travel speed of the machine is above a predetermined value.

16. The machine of claim 10, wherein the operator input device includes a steering wheel.

17. The machine of claim 10, wherein the operator input device includes a joystick.

18. The machine of claim 10, wherein the operator input device includes a steering wheel and a joystick, and wherein the joystick controls operation of the steering actuator in response to a position of the joystick, and the steering wheel controls operation of the steering actuator in response to a speed of the steering wheel.

19. The machine of claim 10, wherein the steering command is a steering velocity command.

20. A method for steering a machine having at least one steerable traction device, the method comprising:
    moving the at least one steerable traction device in response to a position of an operator input device during a first operational condition; and
    moving the at least one steerable traction device in response to a speed of the operator input device during a second operational condition,
    wherein the position of the operator input device affects a steering command for operation of the steering actuator during the first operational condition, and
    wherein the speed of the operator input device affects a steering command for operation of the steering actuator during the second operational condition.

* * * * *